United States Patent
Yamashita (10) Patent No.: US 7,821,760 B2
(45) Date of Patent: Oct. 26, 2010

(54) COUNTER ELECTROMOTIVE FORCE PREVENTION UNIT

(75) Inventor: Hiroshi Yamashita, Isahaya (JP)

(73) Assignee: Audio-Labo Corporation, Isahaya-shi, Nagasaki (JP)

(*) Notice: Subject to any disclaimer, the term of this patent is extended or adjusted under 35 U.S.C. 154(b) by 786 days.

(21) Appl. No.: 10/558,355

(22) PCT Filed: May 27, 2004

(86) PCT No.: PCT/JP2004/007645

§ 371 (c)(1),
(2), (4) Date: Sep. 11, 2006

(87) PCT Pub. No.: WO2004/109887

PCT Pub. Date: Dec. 16, 2004

(65) Prior Publication Data

US 2007/0159134 A1    Jul. 12, 2007

(30) Foreign Application Priority Data

May 28, 2003  (JP) .............. 2003-150411
Mar. 26, 2004 (JP) .............. 2004-093260

(51) Int. Cl.
*H01H 47/00* (2006.01)
(52) U.S. Cl. .................. 361/139; 320/109
(58) Field of Classification Search ........ 361/139; 320/109
See application file for complete search history.

(56) References Cited

U.S. PATENT DOCUMENTS 3,564,333 A * 2/1971 Cramer et al. ........... 315/171
4,415,959 A * 11/1983 Vinciarelli ............. 363/21.04
4,971,583 A   11/1990 Umehara
5,617,016 A * 4/1997 Borghi et al. ........... 323/284

(Continued)

FOREIGN PATENT DOCUMENTS

JP    H02092799    3/1990

(Continued)

OTHER PUBLICATIONS

Paul Horowitz, The Art of Electronics, 2006, The Press Syndicate of the University of Cambridge, Second Edition, 229-230.*

(Continued)

*Primary Examiner*—Stephen W Jackson
*Assistant Examiner*—Tien Mai
(74) *Attorney, Agent, or Firm*—Wood, Herron & Evans, L.L.P.

(57) ABSTRACT

A counter electromotive force prevention unit for batteries is provided that can prevent occurrence of noise due to the counter electromotive force generated by loads of a battery and turning on and off of the charging generator, that can suppress noise emanating from the car audio speakers which are electrical equipment and malfunctioning of electronic equipment, and that can be easily attached to an existing battery. A blocking diode (104) and a fuse (105) that fuses with overcurrent are serially connected between the positive lead wire (102) and negative lead wire (103) that are respectively connected to the positive terminal and negative terminal of the battery which is the direct-current supply source, and a capacitor (106) is connected in parallel to the blocking diode (104).

3 Claims, 6 Drawing Sheets

U.S. PATENT DOCUMENTS

| | | | | |
|---|---|---|---|---|
| 6,083,369 | A | * | 7/2000 | Tanigawa .................. 204/424 |
| 6,316,907 | B1 | * | 11/2001 | Botti et al. ................. 320/104 |
| 2001/0035697 | A1 | * | 11/2001 | Rueger et al. .......... 310/316.03 |

FOREIGN PATENT DOCUMENTS

| | | |
|---|---|---|
| JP | H02092799 | 4/1990 |
| JP | 7-9849 | 1/1995 |
| JP | 7-283797 | 10/1995 |
| JP | 8-47244 | 2/1996 |
| JP | H11083023 | 3/1999 |
| JP | 2001-326300 | 11/2001 |
| JP | 2002-094348 * | 3/2002 |

OTHER PUBLICATIONS

Japanese Patent Office, Japanese Office Action in counterpart JP Application No. 2004-093260, issued Jun. 24, 2008, 4 pages.

Japanese Patent Office, *International Search Report and Written Opinion*, PCT/JP2004/007645, Mailed Sep. 21, 2004 (9 pages).

* cited by examiner

FIG. 6A
WAVEFORM AT POINT A
(WHEN ON)

FIG. 6B
WAVEFORM AT POINT A
(WHEN OFF)

FIG. 6C
WAVEFORM AT POINT C
(WHEN OFF)

WAVEFORM AT POINT A
(WHEN ON)

FIG. 8B

WAVEFORM AT POINT A
(WHEN OFF)

PRIOR ART

FIG. 13

PRIOR ART

US 7,821,760 B2

COUNTER ELECTROMOTIVE FORCE PREVENTION UNIT

TECHNICAL FIELD

This invention relates to a counter electromotive force prevention unit of a direct-current power source for absorbing the counter electromotive force that occurs in inductive loads.

Priority is claimed on Japanese Patent Application No. 2003-150411 filed on May 28, 2003 and Japanese Patent Application No. 2004-093260 filed on Mar. 26, 2004, the contents of which are incorporated herein by reference.

BACKGROUND ART

Figure 12:
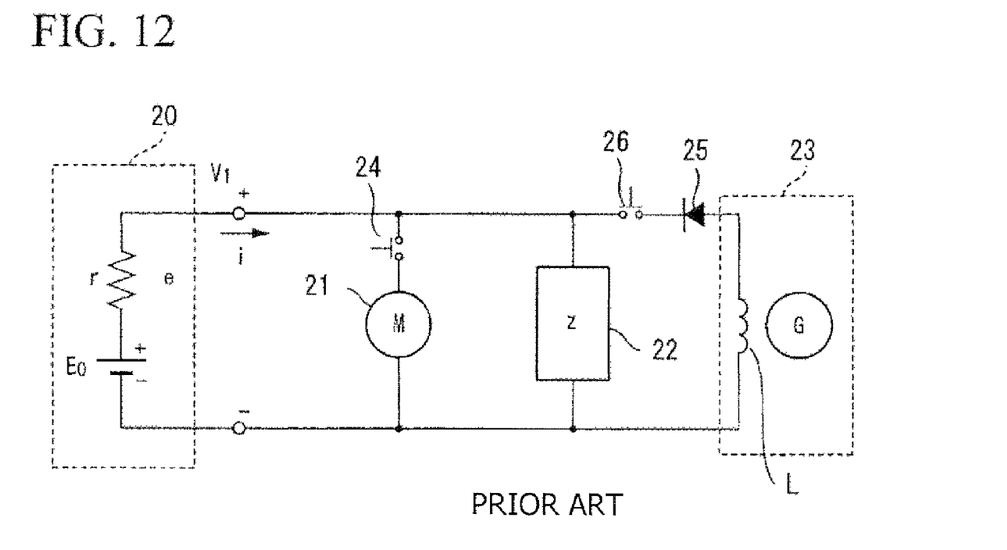
FIG. 12 is an electric circuit diagram of an automotive battery and automotive equipment.

Taking the example of an automotive battery as a direct-current power source, automotive batteries ordinarily use a chargeable secondary battery. When the battery and the automotive equipment are expressed by electric circuitry, they are as shown in FIG. 12. In the figure, 20 is a battery, 21 is a self-starting motor, 22 is electrical equipment, 23 is a generator, 24 is a starter switch, 25 is a rectifier diode, and 26 is an automatic on/off switch that is automatically engaged when the electromotive force of the charging generator 23 is equal to or greater than the voltage of the battery.

The battery 20 is expressed by a pure battery Eo and internal resistance r, and a voltage drop e=r i occurs due to an output current i and internal resistance r, such that a voltage V1 of an output terminal becomes V1=Eo−e=Eo−r i As the loads of the battery 20, there are the self-starting motor 21 and the electrical equipment 22. Inductance components (inductive loads) exist not only in the self-starting motor 21, as a matter of course, but also in the electrical equipment 22 such as a car air conditioner and car audio. Counter electromotive force occurs from these inductance components, and this becomes noise that is superimposed on the voltage of the output terminal.

Furthermore, as the automatic on/off switch 26 provided at the plus side of the charging generator 23 is turned on and off while the voltage of the battery 20 is monitored, a coil L of the charging generator 23 is open during the off times, which impedes absorption of the counter electromotive force that has occurred.

This type of counter electromotive force due to inductance components causes grating noise in car audio and radio speakers, and also causes flickering in car navigation and television images.

Figure 13:
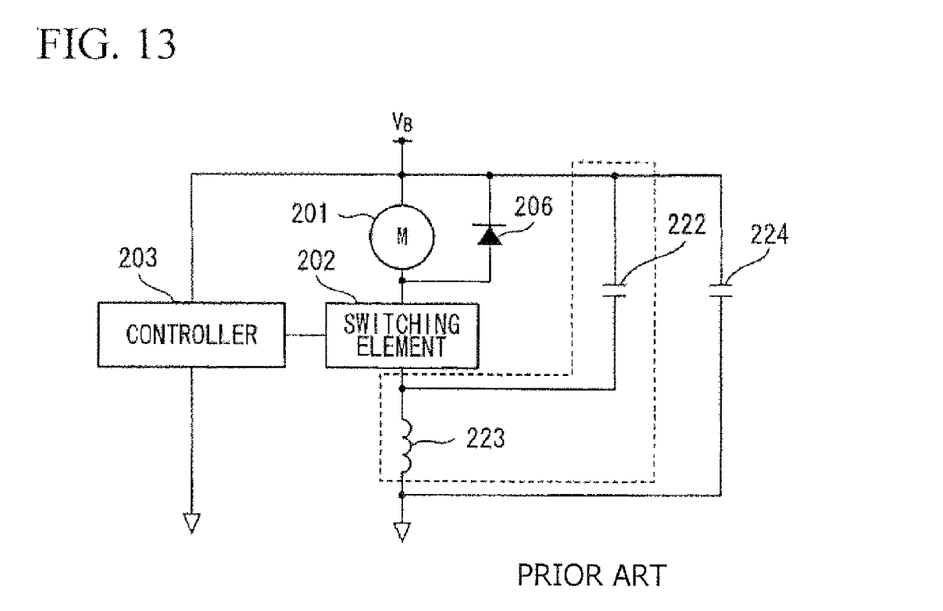
FIG. 13 is a circuit diagram that shows an example of a conventional noise filter.

Conventionally, as shown, for example, in FIG. 13, noise is reduced by regenerating the noise that occurs in a blower motor 201 to a battery power source VB by means of a diode 206; the harmonic components of the noise are attenuated by a capacitor 224; the noise that occurs between battery power sources due to the switching of a switching element 202 is attenuated by an LC filter configured from an electrolytic capacitor 222 and inductance 223; the magnitude of noise generated when the switching element 202 is off is reduced by means of the inductance 223; and the voltage fluctuations between the battery power sources are mitigated by the electrolytic capacitor 222 (for example, see Japanese Unexamined Patent Application, First Publication No. H07-283797).

However, with noise filters using capacitors and inductances, it is only possible to remove harmonic components and specified frequency components, and there is the problem that there is little inhibiting effect on high-peak counter electromotive force.

Moreover, as conventional noise filters are attached to the electrical equipment itself, there is the problem that they cannot be newly installed in existing electrical equipment.

DISCLOSURE OF INVENTION

This invention was made in light of the above circumstances. It is an object of the present invention to provide a counter electromotive force prevention unit in a circuit arrangement configured so as to supply power from a direct-current power source such as a battery to loads including inductive loads via a circuit element or a circuit unit that conducts switching operations, which is capable of preventing the occurrence of noise due to the counter electromotive force generated by the inductive loads during the switching operations by the circuit element or the circuit unit that conducts the switching operations.

In order to accomplish the aforementioned object, the counter electromotive force prevention unit of a first aspect of this invention is a counter electromotive force prevention unit in a circuit arrangement configured so as to supply power from a direct-current power source such as a battery to a load including an inductive load via a circuit element or a circuit unit that conducts a switching operation, the counter electromotive force prevention unit comprising: a diode which is connected in parallel to an output terminal of the direct-current power source and absorbs a counter electromotive force generated by the inductive load; and a capacitor which is connected in parallel to the diode.

With the counter electromotive force prevention unit of the first aspect of this invention, in the circuit arrangement configured so as to supply power from the direct-current power source such as the battery to the load including the inductive load via the circuit element or the circuit unit that conducts the switching operation, a counter electromotive force prevention unit is installed that has a diode connected in parallel to the output terminal of the direct-current power source and absorbs the counter electromotive force that occurs due to the inductive load, and the capacitor which is connected in parallel to the diode, with the result that it is possible to effectively prevent the occurrence of noise due to the counter electromotive force that occurs due to the inductive load during the switching operation by the circuit element or the circuit unit that conducts the switching operation.

The counter electromotive force prevention unit of a second aspect of this invention is a counter electromotive force prevention unit for a battery comprising: a blocking diode and a fuse element that fuses with overcurrent which are serially connected between a positive lead wire and a negative lead wire that are respectively connected to a positive terminal and a negative terminal of a direct-current supply source; and a capacitor which is connected in parallel with the blocking diode.

In the counter electromotive force prevention unit of the second aspect of this invention, it is also acceptable that solderless terminals are provided on ends of the positive lead wire and the negative lead wire.

With the counter electromotive force prevention unit of the second aspect of this invention, it is possible to rapidly suppress noise and prevent the counterflow of unnecessary current to electrical equipment by inserting counter voltage absorbing diodes in, for example, an automotive battery. As a result, the electrical equipment can operate normally, and the entire automobile can be operated smoothly. There is also the effect that noise of the FM radio installed in the automobile is reduced, and its sound quality is improved, and that noise of the AM radio is reduced. Furthermore, shock caused by shift operation is eliminated in automatic vehicles, resulting in a quieter ride and improved fuel consumption ratio.

Moreover, as it is sufficient to merely conduct external attachment to the positive terminal and negative terminal of the battery, it can be easily added without need of refurbishing existing electrical equipment.

BEST MODE FOR CARRYING OUT THE INVENTION

Figure 1:
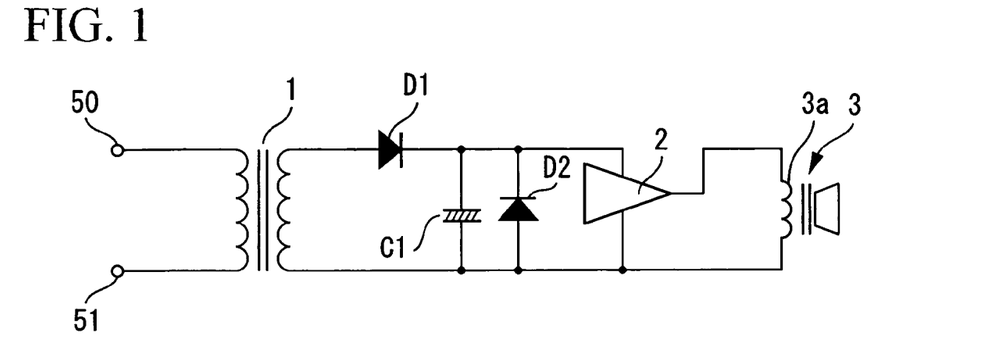
FIG. 1 is a circuit diagram that shows the configuration of an audio circuit that applies this invention.

Below, an embodiment of this invention is explained in detail with reference to drawings. The configuration of an audio circuit that applies this invention is shown in FIG. 1. In this figure, the audio circuit that applies this invention is provided with a transformer 1 having input terminals 50 and 51 to which input signals are applied, a diode D1 that is connected to the secondary side of the transformer and that rectifies the alternating current signals that are inputted, a smoothing capacitor C1, an amplifier 2, and a speaker 3.

In addition, a diode D2 for absorbing counter electromotive force is connected in parallel to the smoothing capacitor C1.

Figure 2:
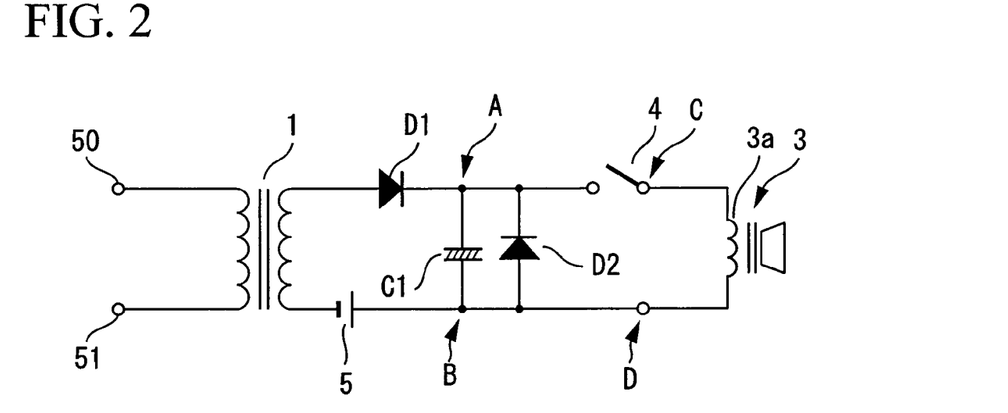
FIG. 2 shows a circuit that replaces the amplifier in the audio circuit shown in FIG. 1 with a switch, and that inserts a battery on the secondary side of the transformer instead of inputting alternating current signals to the transformer.
Figure 3:
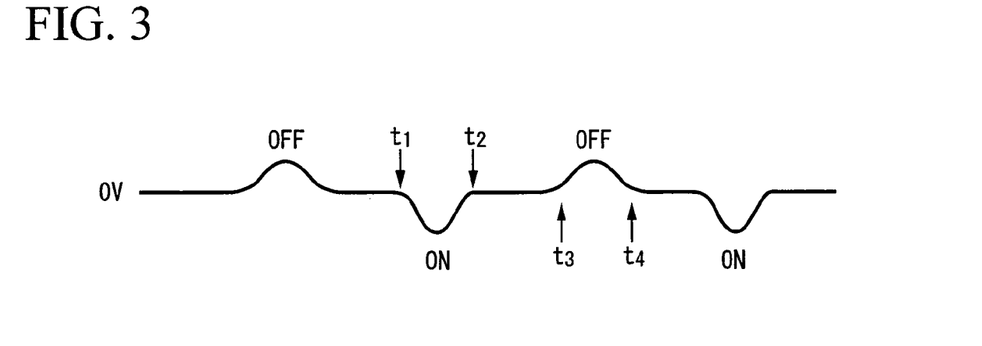
FIG. 3 is a drawing that shows the electric potential waveform at point A when the switch 4 conducts on/off operations in the circuit shown in FIG. 2.

As the amplifier 2 conducts switching operations, one obtains the circuit shown in FIG. 2 when the amplifier 2 is replaced by a switch 4, and when a battery 5 is inserted with the illustrated polarity on the secondary side of the transformer 1 instead of having alternating current signals inputted to the input terminals 50 and 51 of the transformer 1. For purposes of simplifying circuit operations, operations at the time when the switch 4 conducts on/off operation are explained with reference to FIG. 3 with the circuit shown in FIG. 2, rather than with the circuit shown in FIG. 1. FIG. 3 shows the voltage waveform at point A on the cathode side of the diode D1 at the time of on/off operation of the switch 4.

In FIG. 2, when the switch 4 is switched, for example, from the off state to the on state at time t1, the electromotive force of the battery 5 is applied so that point D becomes a positive polarity relative to a drive coil 3a of the speaker 3, while point C which is on the switch 4 side becomes a negative polarity relative to the drive coil 3a of the speaker 3, with the result that the capacitor C1 is charged so that point B becomes a positive polarity, and point A becomes a negative polarity. As a result, the electric potential of point A begins to drop from 0 V in the negative direction, and declines to a prescribed level. Subsequently, the electric charge stored in the capacitor C1 is discharged via the diode D2 and the drive coil 3a, with the result that the electric potential of point A rises, and is restored to the original electric potential at time t2.

Next, when the switch 4 is switched from the on state to the off state at time t3, counter electromotive force occurs such that point C of the drive coil 3a becomes a negative polarity relative to the drive coil 3a, and point D of the drive coil 3a becomes a positive polarity relative to the drive coil 3a, and the current flows from point A into the capacitor C1 via the diode D2, with the result that the capacitor C1 is charged so that the point A side becomes a positive polarity, and point B becomes a negative polarity.

Accordingly, the electric potential of point A begins to rise from 0V in the positive direction, and rises to a prescribed level. Subsequently, the electric charge stored in the capacitor C1 is discharged via the diode D1 and the secondary winding of the transformer 1 so that it returns to the battery 5 which is the power source. The electric charge is also discharged via the diode D2. As a result, the electric potential of point A begins to drop, and is restored to the 0 V level at time t4.

In this way, as shown in FIG. 3, the electric potential of point A slowly changes so that it temporarily rises or drops due to the functioning of the smoothing capacitor C1 and the diode D2 that absorbs the counter electromotive force at times of on/off changeover of the switch 4.

Figure 4:
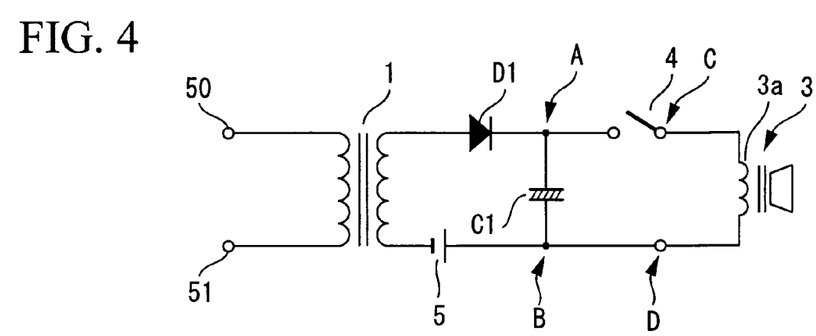
FIG. 4 is a drawing that shows a circuit where the diode D2 is removed from the circuit shown in FIG. 2.

Next, FIG. 4 shows a circuit where the diode D2 is removed from the circuit shown in FIG. 2. In this circuit, when the switch 4 is made to conduct on/off operation, the electric potential waveform at point A is almost the same as in FIG. 3.

Figure 5:
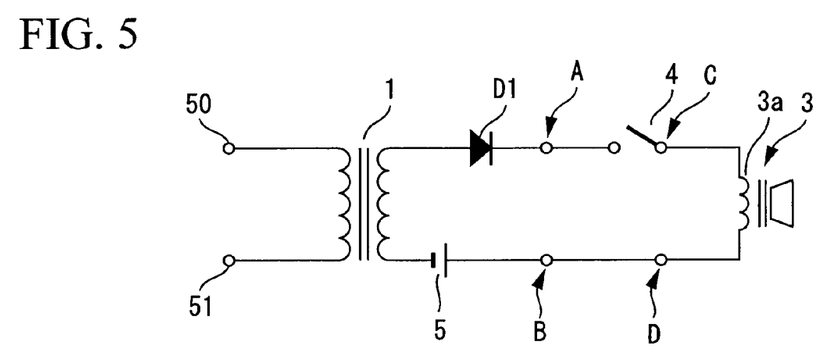
FIG. 5 is a drawing that shows a circuit where the capacitor C1 and diode D2 are removed from the circuit shown in FIG. 2.
Figure 6A:
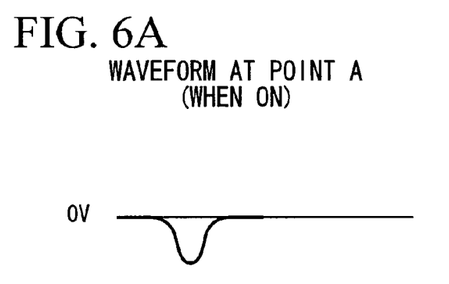
FIG. 6A and FIG. 6B are waveform drawings that show the state of change in electric potential at point A when the switch 4 is made to conduct on/off operations in the circuit shown in FIG. 5.
Figure 6B:
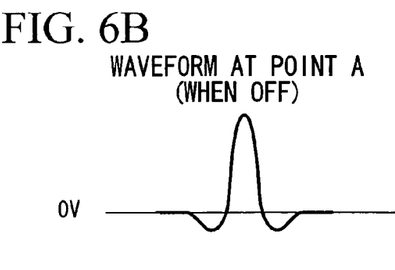
Figure 6C:
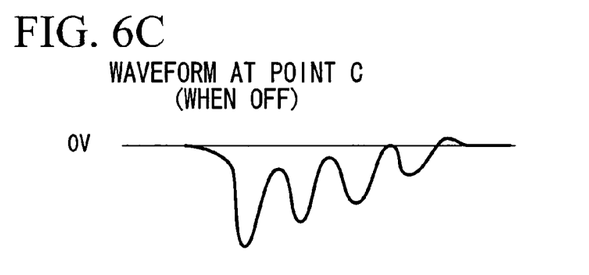
FIG. 6C is a waveform drawing that shows the state of change of electric potential at point C when the switch 4 is made to conduct on/off operations in the circuit shown in FIG. 5.

Next, FIG. 5 shows a circuit where the capacitor C1 and the diode D2 have been removed from the circuit shown in FIG. 2. FIGS. 6A to 6C show waveforms expressing the state of change in electric potential at point A and point C in this circuit when the switch 4 is made to conduct on/off operation. As shown in FIG. 6B, when the switch 4 is switched from the on state to the off state, one discerns a major change in electric potential at point A compared to the case shown in FIG. 3.

Moreover, as shown in FIG. 6C, one observes an oscillating waveform that attenuates with the passage of time with regard to the electric potential (counter electromotive force) of point C when the switch 4 is switched from the on state to the off state. At this time, the electric potential at point D is a waveform that inverts the electric potential at point C.

Figure 7:
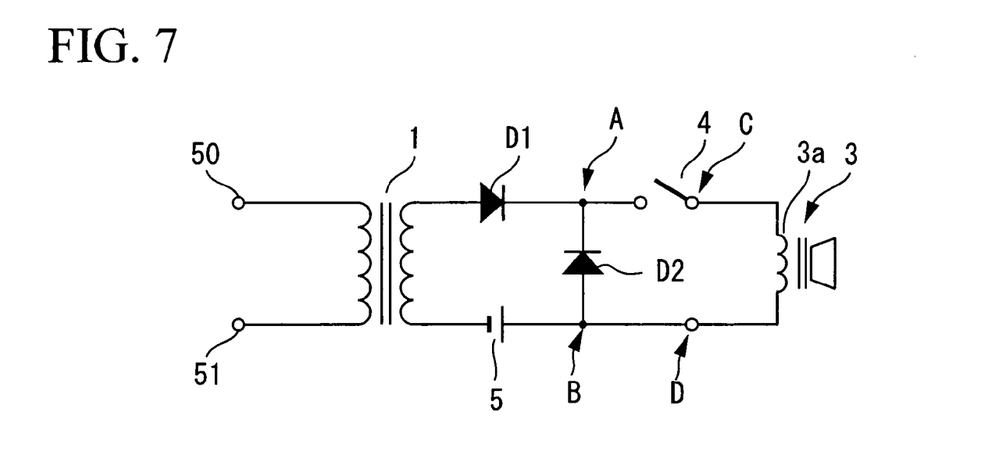
FIG. 7 is a drawing that shows a circuit where the capacitor C1 is removed, while the diode D2 remains in the circuit shown in FIG. 2.
Figure 8A:
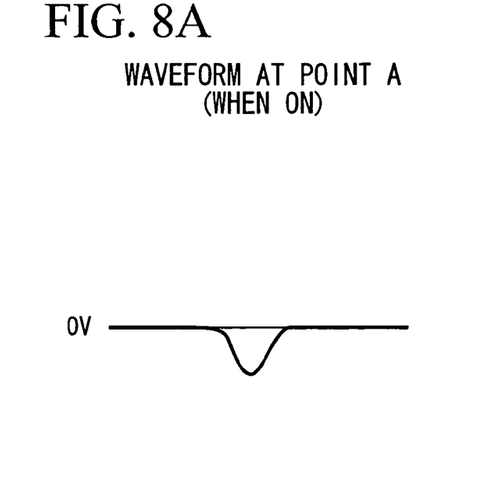
FIG. 8A and FIG. 8B are waveform drawings that show the state of change in electric potential at point A when the switch 4 is made to conduct on/off operations in the circuit shown in FIG. 7.
Figure 8B:
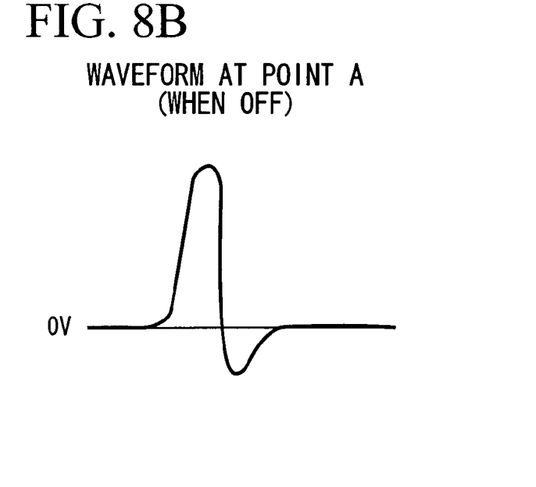

Next, FIG. 7 shows a circuit where the capacitor C1 is removed while the diode D2 remains in the circuit shown in FIG. 2. FIGS. 8A and 8B show electric potential waveforms at point A when the switch 4 is made to conduct on/off operation in this circuit. As shown in FIG. 8A, the electric potential waveform of point A at the time when the switch 4 is switched from the off state to the on state is not completely identical to the case of the circuit shown in FIG. 5 (the waveform shown in FIG. 6A), but there is little change.

In contrast, as shown in FIG. 8B, with regard to the electric potential waveform of point A at the time when the switch 4 is switched from the on state to the off state, one discerns a major change compared to the case of the circuit shown in FIG. 5 (FIG. 6B). This is due to the fact that, in the circuit shown in FIG. 5, the electric potential waveform at point D (a waveform that inverts the waveform shown in FIG. 6C) is superimposed onto the electric potential waveform at point A when the switch 4 is switched from the on state to the off state, that is, onto the electric potential waveform at point A shown in FIG. 6B.

Thus, the counter electromotive force occurring in the drive coil 3a of the speaker 3 when the switch 4 is switched from the on state to the off state is absorbed by the diode D2 that is connected in parallel to the smoothing capacitor C1, and supplied to the battery 5 via the diode D1 and the secondary winding of the transformer 1.

In the circuit shown in FIG. 2, the counter electromotive force occurring in the drive coil 3a of the speaker 3 when the switch 4 is switched from the on state to the off state is absorbed by the diode D2, and recharging is conducted in the capacitor C1 so that point A becomes a positive polarity, and point B becomes a negative polarity. This capacitor C1 has not only the inherent function of smoothing the pulsating current after the alternating current signals have been rectified by the diode D1, but also the function of smoothing the counter electromotive force occurring in the inductive loads such as the drive coil 3a of the speaker 3.

In the case where the power source is a battery, the capacitor C1 has the function of returning the harmonic components produced by the counter electromotive force generated in inductive loads such as the drive coil 3a of the speaker 3 to the battery side.

Figure 9:
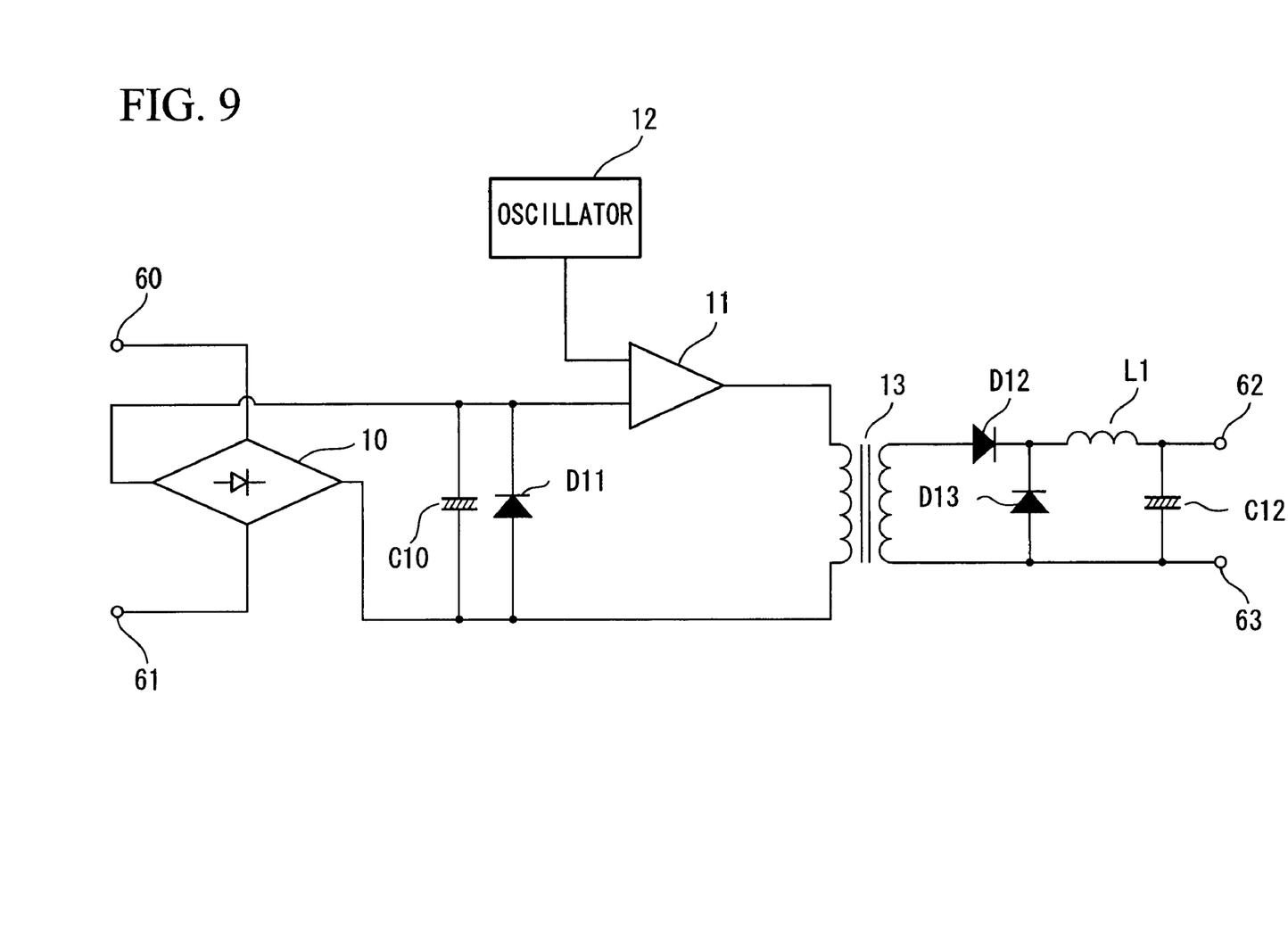
FIG. 9 is a drawing that shows an example of configuration of a switching power source that applies this invention.

Next, FIG. 9 shows an example of configuration of a switching power source that applies this invention. In this figure, there is a rectifier circuit 10, a capacitor C10 for smoothing an output voltage of the rectifier circuit 10, a counter electromotive force absorbing diode D11 that is connected in parallel to the capacitor C10, a comparator 11, an oscillator 12, a transformer 13, diodes D12 and D13, and a smoothing circuit consisting of a coil L1 and capacitor C12.

With the switching power source of the aforementioned configuration, alternating current signals (for example, pulse signals of 100 kHz) that change periodically between high level and low level are outputted by the comparator 11, into which the output of the rectifier circuit 10 and the output of the oscillator 12 are inputted, according to the results of comparison of the output of the rectifier circuit 10 and the output of the oscillator 12. These alternating current signals undergo transformation by the transformer 13, and rectified by the diode D12, and the smoothed direct current voltage is outputted to output terminals 62 and 63 by the smoothing circuit consisting of the coil L1 and the capacitor C12.

As the switching power source of the aforementioned configuration contains numerous inductances which are inductive loads, counter electromotive force occurs in the transformer 13, coil L1 and so on in a manner similar to the previously discussed the drive coil of the speaker of the audio circuit whenever switching is conducted by the comparator. However, it is possible to absorb the generated electromotive force by connecting a diode with the polarity shown in FIG. 9 in parallel to the smoothing capacitor C10.

As a result, unnecessary counter electromotive force can be resupplied to the smoothing capacitor, and the occurrence of noise prevented, while power consumption can be reduced in proportion to the counter electromotive force.

Figure 10:
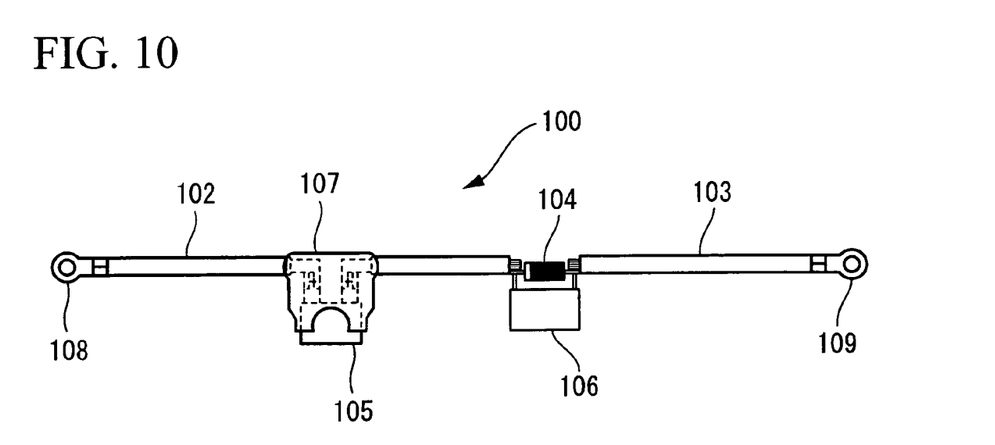
FIG. 10 is a drawing that shows an external view of a counter electromotive force prevention unit according to an embodiment of this invention.

Next, FIG. 10 shows a specific configuration of the counter electromotive force unit according to an embodiment of this invention.

FIG. 10 shows an external view of the counter electromotive force prevention unit 100 according to an embodiment of this invention. A blocking diode 104 and a fuse 105 are serially connected between a positive lead wire 102 and a negative lead wire 103, and a capacitor 106 is connected in parallel to the blocking diode 104. The fuse 105 is removable from a fuse socket 107 so that the fuse 105 can be replaced when it fuses. Solderless terminals 108 and 109 are attached to the tips of the positive lead wire 102 and negative lead wire 103, and establish secure contact when connection is made to the positive electrode and negative electrode of the battery, and also reduce contact resistance.

Figure 11:
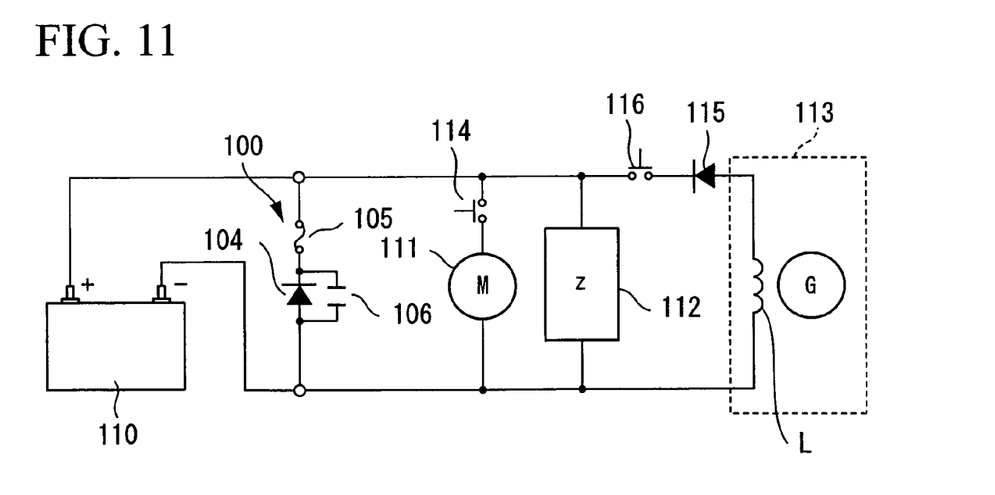
FIG. 11 is a circuit diagram that shows the state where the counter electromotive force prevention unit according to this invention is connected to a battery.

FIG. 11 is a circuit diagram of the state where the counter electromotive force prevention unit 100 of this invention is connected to a battery 110. In the figure, 111 is a self-starting motor, 112 is electrical equipment, 113 is a generator, 114 is a starter switch, 115 is a rectifier diode, and 116 is an automatic on/off switch that is automatically engaged when the electromotive force of the charging generator 113 is equal to or greater than the voltage of the battery. In practical terms, the counter electromotive force prevention unit 100 is directly connected to the positive terminal and negative terminal of the battery 110.

As stated above, as the load of the battery 110, there are the self-starting motor 111 and the electrical equipment 112. Inductance components exist not only in the self-starting motor 111 as a matter of course, but also in the electrical equipment 112 such as a car air conditioner and car audio. Counter electromotive force is generated from these inductance components, and this constitutes noise that is superimposed on the voltage of the output terminal.

Furthermore, as the automatic on/off switch 116 provided at the plus side of the charging generator 113 is turned on and off while the voltage of the battery 110 is monitored, a coil L of the charging generator 113 is open in the off state, impeding absorption of the generated counter electromotive force.

However, as a counter electromotive force prevention unit 100 is provided, the counter electromotive force generated by the inductance components of the self-starting motor 111, electrical equipment 112 and charging generator 113 flows to the blocking diode 104 where it is absorbed, and it does not appear at the output terminal of the battery 110.

In this manner, by inserting the blocking diode 104 in the battery 110, noise is rapidly suppressed, and counterflow of unnecessary current to electrical equipment is prevented. Harmonic noise in the regular and reverse directions can be absorbed by the capacitor 106. Moreover, in the unlikely event where the blocking diode 104 and capacitor 106 malfunction and short-circuit, the fuse 105 fuses due to the large amount of current flowing from the battery 110, thereby preventing accidents.

In the case where the battery 110 has a 12 V rating, it is possible to employ the capacitor 106 with capacitance of 0.47 μF and a withstand voltage of 250 V.

INDUSTRIAL APPLICABILITY

A counter electromotive force prevention unit for direct-current power sources is provided, which absorbs the counter electromotive force generated in inductive loads, and which is applied to audio circuits, switching power sources and the like. The counter electromotive force prevention unit of this invention is able to effectively prevent occurrence of noise due to the counter electromotive force generated by inductive loads at the time of switching operations by a circuit element or circuit unit that conducts switching operations. Moreover, the battery counter electromotive force prevention unit of this invention is able to rapidly suppress noise, and prevent the counterflow of unnecessary current to electrical equipment. Accordingly, when applied, for example, to an automotive battery, it is possible to correctly operate electrical equipment, and the entire automobile operates smoothly. Moreover, there is the effect that noise of the FM radio installed in the automobile is reduced, and its sound quality is improved, and that noise of the AM radio is reduced. Furthermore, the shock caused by shift operation of automatic vehicles is eliminated, resulting in a quieter ride and improved fuel consumption ratio. As it is sufficient to merely conduct external attachment to the positive terminal and negative terminal of the battery, it can be easily added without need of refurbishing existing electrical equipment.

The invention claimed is:

1. A counter electromotive force prevention unit in a circuit arrangement which is configured so as to supply power from a direct-current supply source via a circuit element or a circuit unit that conducts a switching operation and outputs noise cause by an inductive load at the time of the switching operation, the counter electromotive force prevention unit comprising:

a diode whose cathode is connected to a positive terminal of the direct-current supply source and whose anode is connected to a negative terminal of the direct-current supply source, wherein at least one of the anode and cathode connection is made via a fuse element; and a capacitor which is connected in parallel to the diode, wherein the diode absorbs counter electromotive force generated by an inductive load and the terminal of the fuse element connected to the diode and capacitor has no other connections, and the capacitor temporarily drops a voltage of the cathode of the diode to a prescribed level when the supply source is switched to an on state, temporarily raises a voltage of the cathode of the diode to a prescribed level when the supply source is switched to an off state, and reduces harmonic components generated by the counter electromotive force.

2. A counter electromotive force prevention unit according to claim 1, wherein the direct-current supply source is a combination of a battery and a charging generator which repeats an on-operation and an off-operation in accordance with a voltage of the battery, and the charging generation includes another circuit element which generates the counter electromotive force.

3. A counter electromotive force prevention unit according to claim 1, wherein the circuit arrangement comprises:

a comparator;

an oscillator; and a transformer, wherein the comparator outputs an alternating current signal which periodically changes between a high level and a low level in accordance with a comparison result between power from the positive terminal of the direct-current supply source and an output of the oscillator, and the transformer transforms the alternating current signal output from the comparator, which is provided at a primary side of the transformer, and outputs a transformed signal to a secondary side of the transformer.

* * * * *